United States Patent [19]
Fischer et al.

[11] Patent Number: 4,528,628
[45] Date of Patent: Jul. 9, 1985

[54] SHUTDOWN MONITOR FOR A HELICOPTER PITCH BIAS ACTUATOR

[75] Inventors: William C. Fischer, Monroe; Don L. Adams, Fairfield; Stuart C. Wright, Milford; David J. Verzella, Guilford; Arthur L. Sivigny, Bridgeport, all of Conn.

[73] Assignee: United Technologies Corporation, Hartford, Conn.

[21] Appl. No.: 447,360

[22] Filed: Dec. 6, 1982

[51] Int. Cl.³ .................... B64C 11/34; G06F 15/20
[52] U.S. Cl. ................... 364/424; 244/17.13; 244/181
[58] Field of Search ............ 364/424, 434, 435; 318/584; 244/17.13, 178, 181, 187, 193, 195

[56] References Cited
U.S. PATENT DOCUMENTS

| 3,201,675 | 8/1965 | Curran et al. | 244/193 |
| 3,521,838 | 7/1970 | Buffum et al. | 244/17.13 |
| 4,127,245 | 11/1978 | Tefft et al. | 244/17.13 |
| 4,168,045 | 9/1979 | Wright et al. | 244/17.13 |
| 4,330,829 | 5/1982 | Fischer et al. | 364/434 |
| 4,354,234 | 10/1972 | MacLennan et al. | 364/424 |
| 4,376,979 | 3/1983 | Fowler et al. | 364/424 |
| 4,387,430 | 6/1983 | Verzella et al. | 364/434 |

Primary Examiner—Felix D. Gruber
Assistant Examiner—Thomas G. Black
Attorney, Agent, or Firm—Francis J. Maguire, Jr.

[57] ABSTRACT

An improved PBA shutdown monitor circuit senses collective pitch control position rate of change magnitude and inhibits PBA shutdown in response to the continuous presence of sensed magnitude within a range of selected collective pitch rate magnitudes bounded by a slow rate limit signal value and a fast rate limit signal value.

12 Claims, 6 Drawing Figures

SHUTDOWN MONITOR FOR A HELICOPTER PITCH BIAS ACTUATOR

DESCRIPTION

1. Technical Field

This invention relates to helicopter controls, and more particularly to a shutdown monitor for a helicopter pitch bias actuator (PBA).

2. Background Art

As is known in the art, the flight stability characteristics of helicopters can be improved by the use of a PBA in the longitudinal cyclic pitch axis control channel, as described in U.S. Pat. No. 4,168,045. The PBA decouples helicopter longitudinal pitch attitude from collective pitch control commands and ensures a positive static trim gradient.

As is further known in the art, a shutdown monitor is utilized to remove the PBA from its control function in the longitudinal cyclic pitch axis whenever a failed PBA condition exists. This may occur during a PBA runaway condition or in the presence of a delayed PBA response to an overwhelming position command signal. The shutdown is accomplished by comparing the command PBA position signal to the PBA sensed position signal, and removing power to the PBA when the two signals differ (miscompare) by more than a preselected value.

Since delayed PBA response does not necessarily represent functional failure, a resulting shutdown may be a nuisance. Some PBA nuisance trips may be prevented by timing the duration of a miscompare signal and blocking all shutdown signals resulting from miscompare signals that last for less than a selected time interval.

Normally, there are two conditions under which the shutdown monitor will declare a discrepancy a fault and shut down the PBA. The first is if a mechanical failure in the actuator has occurred and a runaway actuator condition exists. The second is when an electronics failure occurs and where, for example, a step voltage that exceeds a predetermined percentage level of actuator authority is commanded into the actuator, and the actuator, being rate-limited, is unable to follow the step. Under either of these two fault conditions, the shutdown of the PBA is desirable.

However, nuisance trips might occur, for example, when a pilot initiates a very abrupt collective control motion such as when the aircraft is entered into autorotation by the pilot's lowering of the collective pitch control to its low pitch position to establish a normal autorotative glide. In such a case, the shutdown monitor is instantaneously presented with a very large error signal, and unless the rate-limited PBA responds faster than the blocking interval, an undesirable PBA shutdown occurs.

The difficulty is that the prior art shutdown monitor is unable to distinguish between an equipment failure and a large and/or abrupt pilot induced input to the collective control and it will declare a fault under either condition.

DISCLOSURE OF INVENTION

The object of the present invention is to provide an improved PBA shutdown monitor which reduces the frequency of nuisance trips.

According to the present invention, an improved PBA shutdown monitor circuit also senses collective pitch control position rate of change magnitude and inhibits PBA shutdown in response to the continuous presence of sensed magnitude within a range of selected collective pitch rate magnitudes bounded by a slow rate limit signal value and a fast rate limit signal value. In further accord with the present invention, the PBA shutdown inhibit is maintained for an additional selected time period whenever the absolute value of the rate of change of collective control position decreases to a value less than the absolute value of the slow rate limit signal value. In still further accord with the present invention, a timing device is used to measure the duration of a PBA shutdown signal, to provide the shutdown signal to a PBA disable circuit only if the shutdown signal duration is greater than a selected time interval, and to reset and hold itself at the beginning of its timing cycle in the presence of an inhibit signal.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
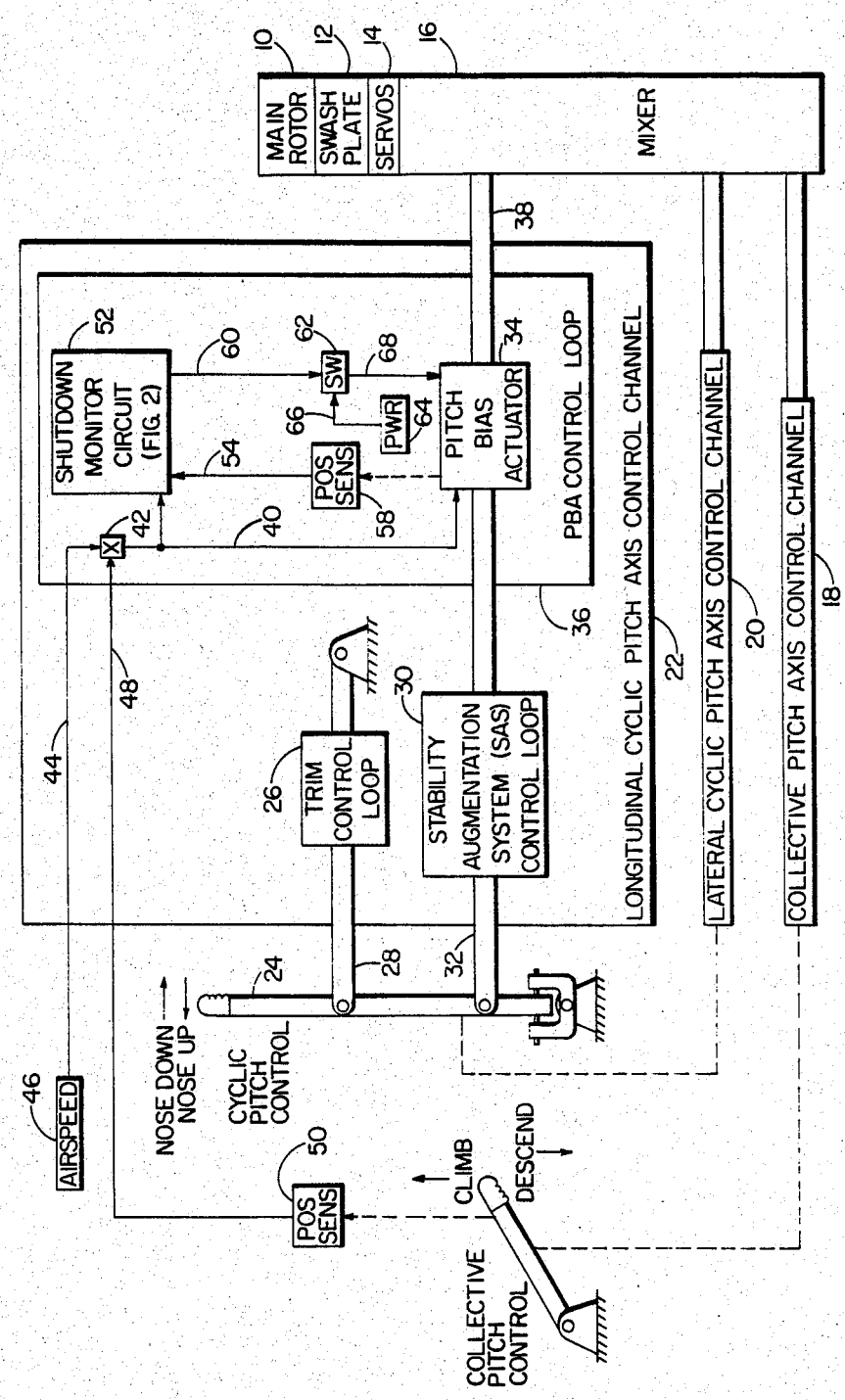
FIG. 1 is a simplified schematic block diagram of a prior art helicopter pitch control system.

Referring to the prior art system of FIG. 1, the pitch of the blades of the main rotor 10 of the helicopter is controlled by a swashplate 12 in response to primary servos 14, which relate to the various controllable axes of the swashplate 12. The servos 14 are controlled by a mixer 16 which combines inputs from the three blade pitch axes of the helicopter, including the collective pitch axis control channel 18, the lateral cyclic pitch axis control channel 20 and the longitudinal cyclic pitch axis control channel 22.

The pilot provides input to the lateral and longitudinal cyclic pitch axes control channels 20, 22 by means of a cyclic pitch control 24. Said lateral and longitudinal cyclic pitch axes control channels are similar, so that only the longitudinal pitch axis control channel is shown in detail. As shown, the control is mechanically connected to a trim outer control loop 26 through a linkage 28 and an inner stability augmentation system (SAS) control loop 30 to one end of a linkage 32, the other end of which is connected to a pitch bias actuator (PBA) 34 of a PBA inner control loop 36. As known in the art the pitch bias actuator decouples helicopter pitch attitude from collective pitch control commands and ensures a positive static trim gradient. It does this by providing longitudinal cyclic pitch bias via a linkage 38 to the mixer 16 in response to the output signal on a line 40 from a multiplier 42 which represents, in simplified form, a complex function of an airspeed signal 44 from an airspeed transducer 46 and a collective pitch stick position sensor signal 48 from the control position sensor 50.

The PBA control includes a shutdown monitor 52 which shuts down the PBA in response to the existence of an offset between command and actual actuator position. This is provided by comparing the actual position signal of the pitch bias actuator on a line 54 with the command position signal on a line 40. The shutdown monitor shuts down the PBA whenever the command to the actuator on a line 40 differs from the output of a position sensor 58 on a line 54 by more than a predetermined percentage value. It does this by means of a shutdown signal on a line 60 to a power interrupt switch 62 which interrupts the normal flow of current from a power source 64 in a power line 66 through the switch 62 and in a power line 68 to the PBA.

Figure 2:
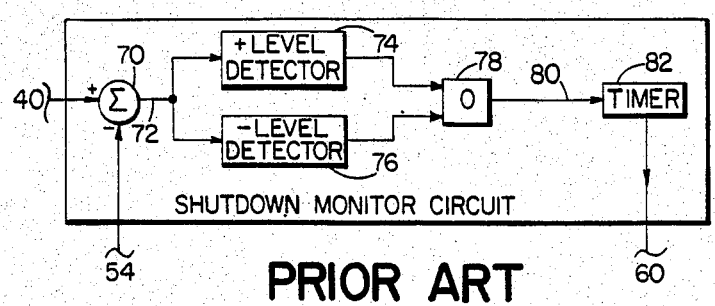
FIG. 2 is a simplified schematic block diagram of a prior art shutdown monitor used in the control system of FIG. 1.

Referring now to FIG. 2, the position command signal to the PBA 40 and the actual PBA position signal 54 are summed in a junction 70 and the difference is presented on a line 72 to level detectors 74, 76. When the absolute value of the difference 72 exceeds a fraction of the full range of the PBA position signal 54, one of the level detectors 74, 76 generates a signal to an OR gate 78, which in turn presents a miscompare signal 80 to a timer 82. The timer initiates a timing cycle that blocks the miscompare signal for a fraction of a second. For example, a value of one half second, more or less, might be chosen. If the miscompare signal 80 is still present at the conclusion of the timing cycle, a PBA shutdown signal 60 is generated by the timer.

Figure 3:
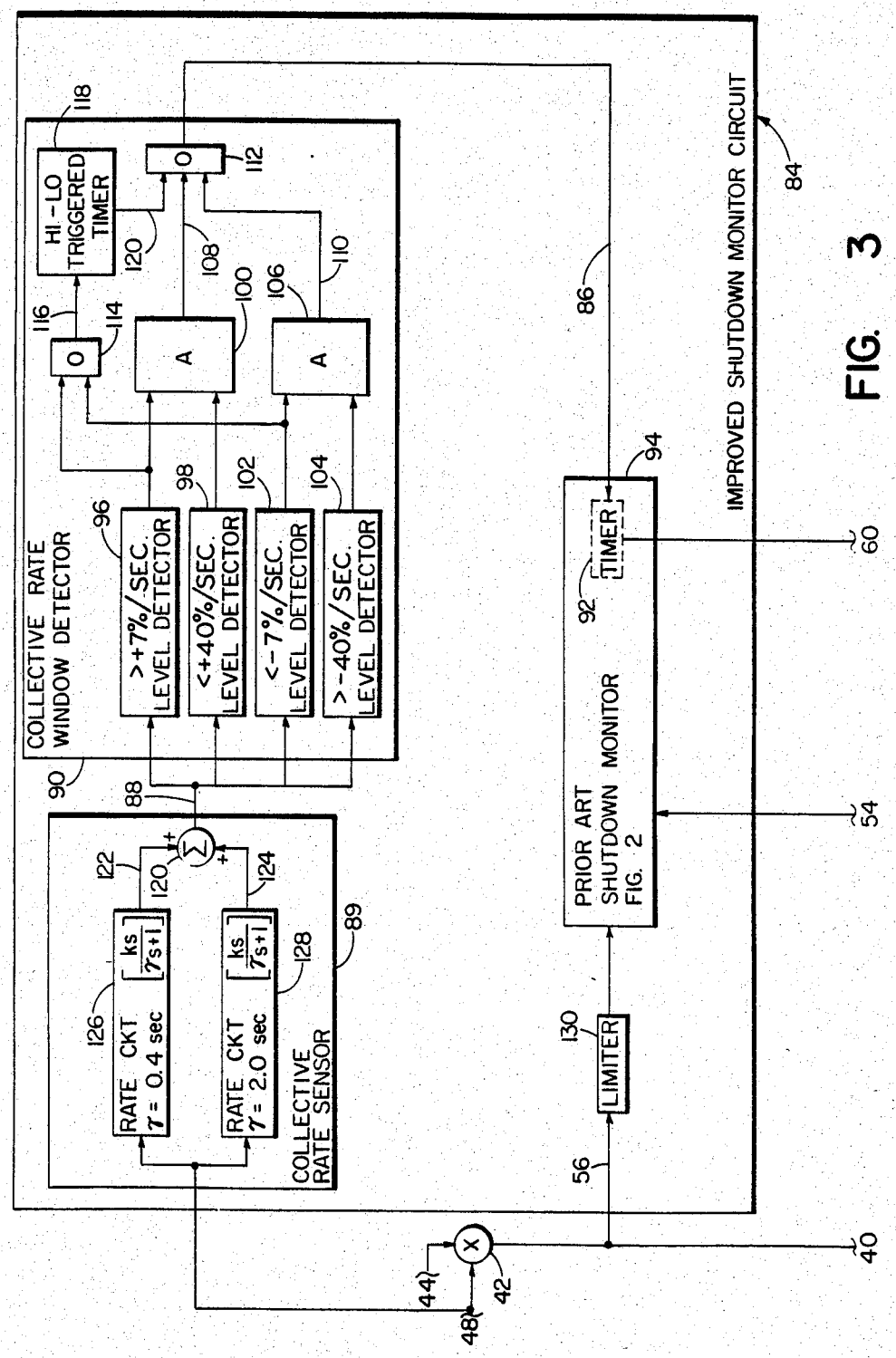
FIG. 3 is a simplified schematic block diagram of the present invention shutdown monitor as may be used in the control system of FIG. 1.

Helicopter maneuvering is often accompanied by rapid and/or large pilot movement of the collective pitch control. Nuisance PBA trips often occur during such maneuvering because the PBA, being rate-limited, is unable to quickly respond to rapid command changes. Referring now to FIG. 3, in an exemplary embodiment of the improved shutdown monitor of the present invention 84, the generation of a PBA shutdown signal 60 is inhibited by a signal on a line 86 which is in turn generated whenever the rate of pilot movement of the collective control falls within certain rate windows that correspond to maneuvering rates.

In the preferred embodiment, the inhibit signal 86 is applied to a timer 92 which blocks a shutdown signal during its timing cycle and resets to the beginning of its timing cycle in the presence of an inhibit signal. However, it should be understood that a timer is not necessary for carrying out the invention and the inhibit signal may be used to merely block a shutdown signal for only so long as the inhibit signal is present and no timer or reset function need be incorporated in or required by the shutdown monitor or the inhibit signal, respectively. Alternatively, logic circuitry may be used to block the application of a shutdown signal to a timer in the presence of an inhibit signal.

A collective control rate signal 88 is applied to a collective control rate window detector 90. The window detector 90 provides a shutdown inhibit signal 86 to the timer 92 of the prior art shutdown monitor 94 whenever the rate of collective pitch control movement is within the selected range of collective rates corresponding to maneuvering. As an example, a range bounded by slow and fast rates of seven and forty percent of collective control authority per second in either the positive or negative directions of collective control movement might be selected.

The outputs of a greater than positive seven percent rate level detector 96 and a less than positive forty percent rate level detector 98 are input to an AND gate 100. The outputs of a less than negative seven percent rate level detector 102 and a greater than negative forty percent rate level detector 104 are input to an AND gate 106. The AND gate outputs 108, 110 are input to an OR gate 112 in order to produce a shutdown inhibit signal 86 whenever the rate of collective control movement is within either rate window.

Figure 4:
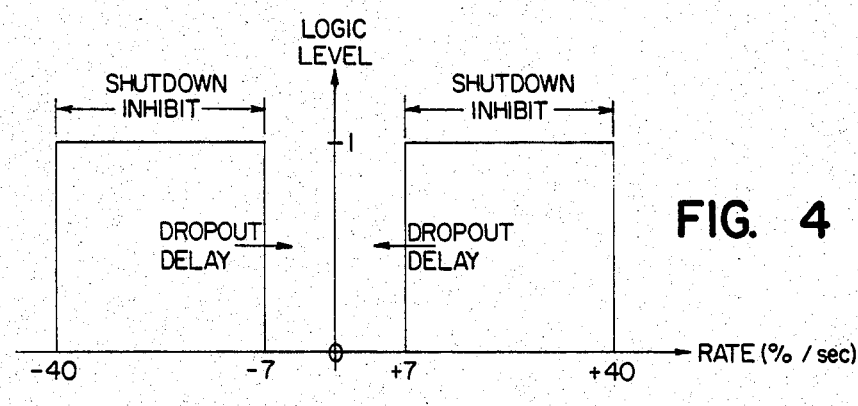
FIG. 4 is an illustration of an example of shutdown inhibit collective rate regions.

Referring to FIG. 4, the inhibit range of the example is shown. It should be understood that the range of collective rates selected will vary according to numerous factors including aircraft type, control system, etc., and it should also be understood that the positive and negative shutdown inhibit windows need not be mirror images and may be bounded by different rate values. The inhibit signal 86 (FIG. 3) will be at logic level one whenever the pilot causes the collective pitch control to move at a rate of between seven and forty percent per second of the total collective pitch control authority in either the positive or negative direction. The logic level one corresponds to the inhibit function. At all other times, except as described below, the logic level is at zero and shutdown is not inhibited.

Referring back to FIG. 3, the outputs of the greater than positive seven percent rate level detector 96 and the less than negative seven percent rate level detector 102 are input to OR gate 114. The output of the OR gate on a line 116 is input to a HI-LO triggered timer 118. The HI-LO trigger timer 118 produces a short duration output on a line 120 whenever the input 116 makes a transition from logic level one to logic level zero. This will occur whenever a particular collective control rate within either the positive or negative inhibit ranges crosses over into the noninhibited range between the positive and negative inhibit ranges.

For example, referring to FIG. 4, a delay in inhibit drop-out will occur whenever the collective rate crosses over from either the positive or negative inhibit regions into the region between positive seven and negative seven percent of collective authority per second. The inhibit function is not delayed when a crossover from an inhibit region to a noninhibit region at higher rates occurs. This is due to the fact that collective rates of greater than forty percent are not probable and are indicative of a failure in the position sensor 50 (FIG. 1).

Referring back to FIG. 3, the purpose of the HI-LO triggered timer 118 is to delay inhibit drop-out so as to provide a short time interval for actuator catch-up just after the rate of collective pitch control movement ceases to be within the inhibit range. The HI-LO triggered timer 118 is normally set to delay drop-out of the inhibit signal 86 for some fraction of a second, such as 0.65 second, more or less. The HI-LO triggered timer 118 may be a 555 timer or other suitable device. The inhibit signal 86 is fed into the timer 92. Assuming a miscompare signal is present, the application of an inhibit signal 86 will cause the timer 92 to reset such that it will begin its count at the beginning when the inhibit signal is removed. The timer 92 may be a binary counter or other suitable device capable of being reset in the manner described above.

Referring back to the rate signal 88 developed by the collective rate sensor 89, a summing junction 120 receives a fast rate signal on a line 122 and a slow rate signal on a line 124 from a pair of rate circuits that differentiate the collective control position signal 48. The fast rate circuit 126 has a relatively short time constant, on the order of one half second, more or less. The slow rate circuit 128 has a time constant that is relatively long, about two seconds, more or less. The slow rate circuit imparts a persistence to the rate signal 88 that permits the actuator to align itself with the command while the shutdown continues to be inhibited for a short time. It also provides a match between the characteristics of the inhibit circuit and another rate circuit used in the PB.A to further counter the pitch attitude effects due to rapid collective motions. The fast rate circuit provides accurate rate signals when the pilot initiates very rapid but small collective pitch control movements. The slow rate circuit might not properly provide accurate rate levels at such times.

A limiter 130 is used when the voltage ranges of the command signal 56 and the response signal 54 do not match. If the command signal range is greater than that of the response signal a limiter 130 is used, as in FIG. 3, to limit the voltage range of the command signal so that it matches that of the response signal. If the response signal range is greater than that of the command signal a limiter is similarly used to limit the voltage range of the response signal so that it matches that of the command signal. This prevents nuisance trips that can occur if a range mismatch exists. For example, if the command voltage range is greater than the response voltage range, and the command voltage enters into that part of its range not covered by the narrower range of the response signal, and the difference between the command and response signals then exceeds the miscompare threshold of the shutdown monitor, an unwarranted PBA shutdown will occur. If a limiter is used to limit the range of the command voltage to that of the response voltage, command voltage excursions beyond the range of the response voltage are cut off and not presented to the summing junction 70 (FIG. 2) for comparison. In this way, some nuisance trips are prevented.

Figure 5:
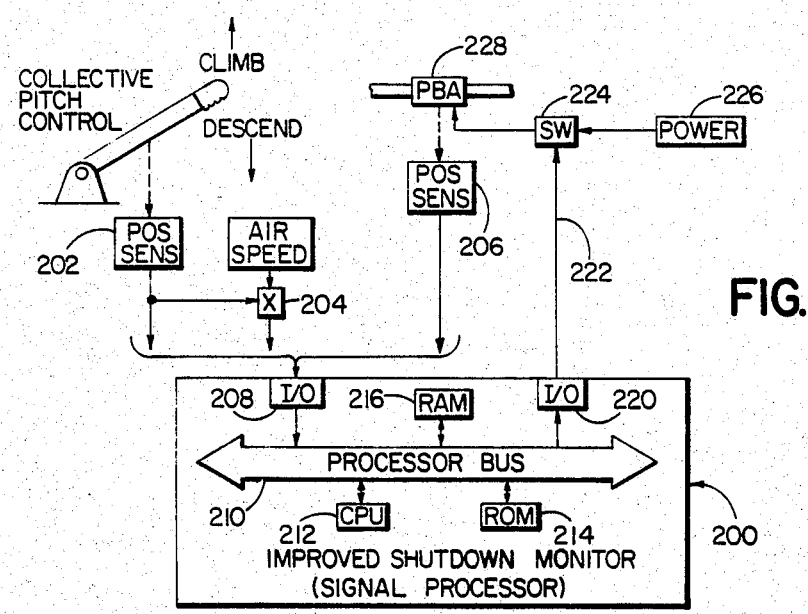
FIG. 5 is a simplified schematic block diagram of an alternative embodiment of the present invention as may be used in the control system of FIG. 1.

In FIGS. 1, 2 and 3, the shutdown monitor circuit is embodied in discrete hardware components which sense collective pitch control position, airspeed, and PBA position to determine whether PBA shutdown should be effected and transmit a shutdown signal to PBA power interrupt circuit. In an alternative embodiment the function of the shutdown monitor may be executed by a signal processor as shown in FIG. 5, which is an illustration of a signal processor 200, which receives a collective pitch control position signal from a collective position sensor 202, a signal which is compound function of airspeed and collective position from a multiplier 204, and a PBA position signal from a PBA position sensor 206 at an input/output port 208, and which are transmitted to a processor bus 210 and then into a central processing unit (CPU) 212 for processing according to a logical sequence stored in memory which may be read only memory (ROM) 214 as detailed by the flow chart in FIG. 6. The processor bus 210 is used by the CPU to gain access to program steps and to numerical constants stored in ROM 214 and for access to memory which may be random access memory (RAM) 216 for temporary storage of the results of computational steps in the logical process. If a PBA shutdown decision is reached by the CPU, a PBA shutdown command is transmitted to input/output port 220 which in turn transmits a PBA shutdown signal 222 to PBA disable circuitry, such as a shutdown switch 224, which interrupts the flow of current from a power source 226 to the PBA 228.

Figure 6:
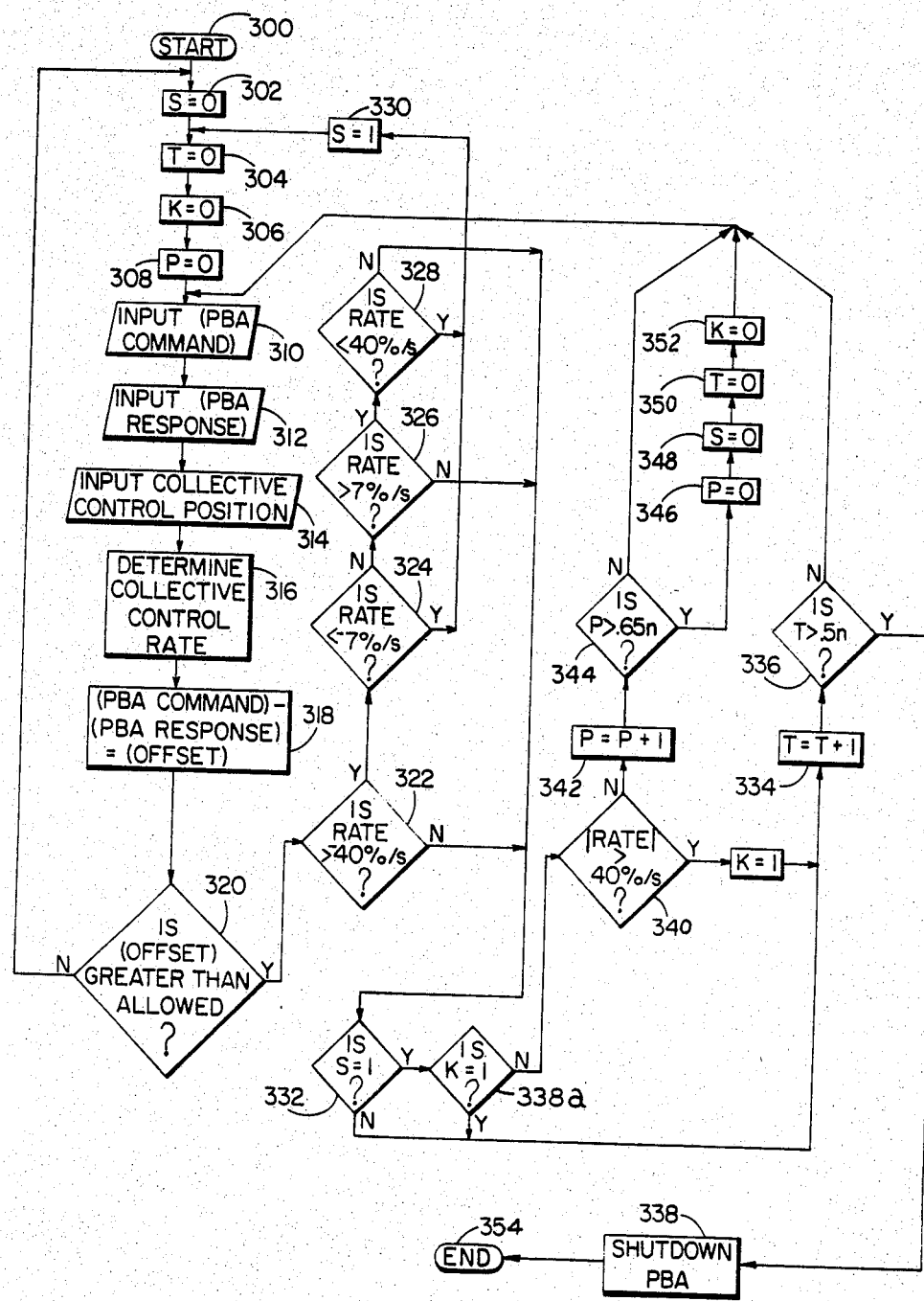
FIG. 6 is a flow chart diagram showing the functions performed by the signal processor of the embodiment of FIG. 5.

Referring now to FIG. 6, the logical process by which the signal processor of FIG. 5 arrives at a decision as to whether or not to shut down the PBA is illustrated. Assuming a clock signal at n Hertz, the logical sequence begins at start block 300. After setting all the variables to zero in initializing steps 302, 304, 306, 308 the current PBA command and response values are obtained in steps 310, 312, and collective control position is obtained in a step 314. After determining the collective control rate in an operational step 316, the difference between the PBA command and response is determined in an operational step 318. Whether this offset difference is greater than allowed is then determined in a decision step 320. If not, the sequence of initializing variables and obtaining command, response, and collective control position, and determining collective control rate and the PBA command response offset is repeated successively until the offset is greater than allowed. It must then be determined whether the collective control rate is within a PBA shutdown inhibit collective rate window. This is accomplished in decision steps 322, 324, 326, 328 which, in this illustration, correspond to the shutdown inhibit rate windows as shown in FIG. 4. If the collective rate is within an inhibit window a variable S is set equal to one in a step 330 and the flow of logic is then returned to the initialization, input, operational, and decisional steps 304–330 loop until either the offset is no longer greater than allowed or the collective rate is no longer within an inhibit window. If the collective rate is no longer within an inhibit window a decision is made in a step 332 as to whether the collective rate has just exited a shutdown inhibit window or not. If not, the logical flow proceeds onto an operational step 334 and a decisional step 336 which are a part of a primary timing loop that also includes input steps 310–314, operational steps 316, 318, and decisional steps 320, 322, 332. If the difference between the PBA command and response remains greater than allowed and the collective control rate does not enter into an inhibit window during the timing cycle and the number of repetitions of the timing sequence exceeds a numerical value, in this example one-half of the clock repetition rate, a decision is made in a block 336 that the timing cycle is completed and a PBA shutdown command is executed in a block 338. If, during the timing cycle, either the difference between the PBA command and response no longer exceeds the allowed difference or the collective pitch control rate falls within an inhibit window the timing loop is exited and the timing variable reset to zero in a step 304 so that upon the occurrence of a subsequent shutdown condition the entire timing sequence is repeated. If a decision is made in a block 332 that the collective pitch control rate has just exited a rate window, a decision is made in a block 338a as to whether the primary timing loop should be immediately entered or whether another decision as to whether or not to enter a secondary timing loop should be made. If a decision is made in the block 338a not to immediately enter the primary timing loop a decision must be made in a block 340 as to whether the absolute value of the collective pitch control rate is greater than, in this example, 40% of actuator authority per second. If the absolute value of the collective pitch control rate is not greater than the selected value it is desirable to enter into a secondary timing loop in order to cause the inhibit function to persist for an additional time period whenever the rate of collective pitch control while within a shutdown inhibit region slows to the point where it crosses over into a noninhibit region. If the absolute value of the rate is found to be not greater than the rates corresponding to the extreme ends of the inhibit regions, the secondary timing loop is entered at an operational step 342 in which the number of passes through the loop is counted in a step 342 and monitored in a decisional step 344 that permits the secondary timing cycle to persist through the loop including input steps 310–314, operational steps 316, 318, decisional steps 320, 322, 332, 338a, 340, until the operational step 342 reaches a count that exceeds, in this example 0.65 times the numerical value of the clock repetition rate. If that value is exceeded all the variables are set to zero in operational steps 346–352. The logical sequence is then allowed to proceed into input steps 310–314, operational steps 316, 318, decisional steps 320, 322, 332, and into the primary timing loop as described hereinbefore. As before, PBA shutdown will be commanded by the outer timing loop after reaching its selected count unless the difference between the PBA command and response is no longer greater than allowed or the collective pitch control rate changes to a value that falls within a PBA shutdown inhibit region. In such a case, the primary timing cycle is interrupted, its count reset to zero, and the logical flow remains in the loop consisting of input steps 310–314, operational steps 316–318, decisional step 320, and the initializing steps 302–308 until the difference between the PBA command and response exceeds an allowed value. In this way, the PBA can be monitored continuously until all of the conditions for shutdown as hereinbefore described are met, in which case a PBA shutdown command is executed in a block 338 and the logical flow ends in a block 354.

The improved shutdown monitor circuit of FIG. 3 and signal processor of FIG. 5 are shown implemented in the context of a particular prior art pitch axis control channel that may have peculiarities and be different from other possible control system configurations in which the present invention may be utilized. For example, the compound function of airspeed and collective pitch control position that is presented to the PBA as its command signal and is monitored by the shutdown monitor and compared to an actual PBA position signal, may be any function of any number of various aircraft parameters and should not be restricted to merely a multiplied function of airspeed and collective pitch control position. Similarly, it should be understood that the invention may also be employed in other pitch axis control channels or control loops that may differ in the mechanical elements, their structure and function, and number.

The flow chart of FIG. 6 illustrates one routine suitable for implementing the improved shutdown monitor function in the processor of FIG. 5. As may be obvious to those skilled in the programming art, any one of a number of alternative programs may be implemented which provide the same function of monitoring a PBA for a shutdown condition shutting down the PBA under certain conditions and according to a sequence of logical steps, and inhibiting such a shutdown when the collective control rate falls within a band of rates that correspond to rapid maneuvering. The logical sequence may or may not include steps incorporating primary and secondary timing loops but may be simplified so that a PBA commandresponse offset greater than allowed is instantaneously transmitted as a shutdown command unless the collective control rate is within a shutdown inhibit rate window.

It should also be understood that the implementations of FIGS. 3 and 5 are not necessarily mutually exclusive since certain functions performed in the hardware of FIG. 3 may be performed by a simple subroutine in an available program that may be utilized by the hardware of FIG. 3 without losing its character as hardware. Similarly, the signal processor of FIG. 5 may be interfaced with other hardware that may perform one or more steps of the logical sequence of FIG. 6 in a fashion that results in the particular implementation retaining some or even most of its character as a signal processing shutdown monitor. Or a hybrid shutdown monitor might be devised that incorporates sufficient signal processing and hardware features so as to lose its predominantly hardware or signal processing character as described herein.

Similarly, although the invention has been shown and described with respect to preferred embodiments thereof, it should be understood by those skilled in the art that the foregoing and various other changes, omissions, and additions may be made therein without departing from the spirit and scope of the invention.

We claim:

1. An improved pitch bias actuator (PBA) shutdown monitor of the type which detects a difference value between a PBA position command signal provided as a function of positioning of a collective pitch control and an actual sensed PBA position signal and which, in response to a selected difference value therebetween, provides an actuator shutdown signal to a PBA disable circuit to disable actuator operation, wherein the improvement comprises:
  sensor means responsive to the collective pitch control for providing a signal indicative of the rate of change of collective pitch control position, and
  shutdown inhibit means, including means for defining a selected range of collective pitch control position rate signal values bounded by a slow rate limit signal value and a fast rate limit signal value; and responsive to said sensor means for comparing said sensed collective pitch control position rate signal magnitude to said range of collective rate signal values and providing, in response to said sensed rate signal magnitude within said selected range of rates, an inhibit signal to the PBA disable circuit to prevent disable circuit response to an actuator shutdown signal.

2. The improved shutdown monitor according to claim 1 wherein said inhibit means includes means for maintaining said inhibit signal for an additional selected time interval following a decrease in the absolute value of said sensed rate signal magnitude ot a value less than the absolute value of said slow rate limit signal value.

3. The improved shutdown monitor according to claim 1, wherein said sensor means, comprises:
  position sensing means, responsive to the positioning of the collective pitch control within its positioning range for providing a collective pitch control position signal at a magnitude indicative thereof; and
  time derivative signal means, responsive to said position sensing means for deriving the change in magnitude of said position signal with respect to time and for providing said derivative as said sensed rate signal magnitude to said shutdown inhibit means.

4. The improved shutdown monitor according to claim 3, wherein said time derivative signal means, comprises:

fast time derivative means, responsive to said position sensing means for deriving, with a short lag characteristic, the change in magnitude of said position signal with respect to time and for providing said fast derivative signal magnitude as part of said sensed rate signal magnitude to said shutdown inhibit means; and slow time derivative means, responsive to said position sensing means for deriving, with a long lag characteristic, the change in magnitude of said position signal with respect to time and for providing said slow derivative signal magnitude as part of said sensed rate signal magnitude to said shutdown inhibit means; and summing mean, responsive to said fast and slow time derivative means for adding the fast derivative signal magnitude to the slow derivative signal magnitude and presenting a summation of said fast and slow derivative signal magnitude to said shutdown inhibit means as said sensed rate signal magnitude.

5. The improved shutdown monitor of claim 1, further comprising:

switch means connected between the PBA disable circuit, the shutdown monitor, and said shutdown inhibit means, and responsive to the shutdown signal and said inhibit signal, said switch means including timing means for providing a disable signal at a selected time interval following the presence of a shutdown signal in the absence, continuously, of said inhibit signal over said selected time interval, said disable signal providing disablement of the actuator operation.

6. The improved shutdown monitor according to claim 1 wherein said shutdown inhibit means includes a slow rate limit value equal to seven percent of collective control authority per second and a fast rate limit value equal to forty percent of collective control authority per second.

7. An improved method for monitoring and controlling pitch bias actuator (PBA) operation of the type which includes the steps of detecting a difference value between a PBA position command signal provided as a function of positioning of a collective pitch control and an actual sensed PBA position signal and in response to a selected difference value therebetween, providing an actuator shutdown signal to a PBA disable circuit to disable actuator operation, wherein the improvement comprises the steps of:

determining the value of the rate of change of collective pitch control position, defining a selected range of collective pitch control position rate values bounded by a slow rate limit value and a fast rate limit value; and comparing said determined collective pitch control position rate value to said range of rate values and providing, in response to said determined rate value magnitude within said selected range of rates, an inhibit signal to the PBA disable circuit to prevent disable circuit response to an actuator shutdown signal.

8. The improved method of claim 7, wherein the step of comparing includes maintaining said inhibit signal for an additional selected time interval following a decrease in the absolute value of said determined rate value magnitude to a value less than the absolute value of said slow rate limit value.

9. The improved method of claim 7, wherein the step of determining includes steps of:

sensing said collective pitch control position and providing a collective pitch control position value at a magnitude indicative thereof; and providing the change in magnitude of said position value magnitude with respect to time as said determined collective pitch control position rate value magnitude for use in said comparing step.

10. The improved method of claim 9, wherein the step of providing includes steps of:

deriving, with a short lag characteristic, the change in magnitude of said position value with respect to time, and for providing said derived change of position magnitude value with respect to time as part of said collective control rate value magnitude; and deriving, with a long lag characteristic, the change in magnitude of said position value with respect to time, and for providing said derived change of position magnitude value with respect to time as part of said collective control rate value magnitude; and adding said short lag and long lag derived position rate magnitudes, together making up said collective control rate value magnitude.

11. The improved method of claim 7, wherein the step of comparing includes the steps of:

measuring the duration of the actuator shutdown signal and providing the shutdown signal to the PBA disable circuit to disable actuator operation only if the shutdown signal duration is greater than a selected time interval; and delaying the commencement of said measuring of the duration of the shutdown signal for so long as said collective pitch control position rate is within said range of rate values.

12. The improved method for monitoring and controlling a PBA according to claim 7 wherein the step of defining includes a slow rate limit value of seven percent of collective control authority per second and a fast rate limit value of forty percent of collective control authority per second.

* * * * *